United States Patent
Staring et al.

(10) Patent No.: US 7,607,024 B2
(45) Date of Patent: Oct. 20, 2009

(54) RECORD CARRIER COMPRISING ENCRYPTION INDICATION INFORMATION

(75) Inventors: Antonius Adriaan Maria Staring, Eindhoven (NL); Boris Skoric, Eindhoven (NL); Menno Anne Treffers, Eindhoven (NL); Maurice Jerome Justin Jean-Baptiste Maes, Eindhoven (NL)

(73) Assignee: Koninklijke Phillips Electronics N.V., Eindhoven (NL)

( * ) Notice: Subject to any disclaimer, the term of this patent is extended or adjusted under 35 U.S.C. 154(b) by 29 days.

(21) Appl. No.: 10/566,510

(22) PCT Filed: Jul. 28, 2004

(86) PCT No.: PCT/IB2004/051303

§ 371 (c)(1),
(2), (4) Date: Jan. 30, 2006

(87) PCT Pub. No.: WO2005/013272

PCT Pub. Date: Feb. 10, 2005

(65) Prior Publication Data

US 2006/0239462 A1    Oct. 26, 2006

(30) Foreign Application Priority Data

Aug. 1, 2003    (EP) ................... 03102396

(51) Int. Cl.
G06F 11/30    (2006.01)
G06F 12/14    (2006.01)
G11B 11/00    (2006.01)
G11B 7/24    (2006.01)
G11B 23/03    (2006.01)

(52) U.S. Cl. .............. 713/193; 369/53.21; 720/719

(58) Field of Classification Search .............. 713/193; 369/53.21
See application file for complete search history.

(56) References Cited

U.S. PATENT DOCUMENTS

| 5,930,358 | A | 7/1999 | Rao | |
| 6,301,663 | B1* | 10/2001 | Kato et al. | 713/176 |
| 6,378,072 | B1* | 4/2002 | Collins et al. | 713/187 |
| 6,438,692 | B2* | 8/2002 | Kato et al. | 713/176 |
| 6,578,149 | B1* | 6/2003 | Kawamae et al. | 726/26 |
| 6,778,757 | B1* | 8/2004 | Kawamae et al. | 386/94 |
| 7,111,169 | B2* | 9/2006 | Ripley et al. | 713/176 |
| 7,116,893 | B2* | 10/2006 | Kawamae et al. | 386/94 |
| 2002/0003880 | A1* | 1/2002 | Kato et al. | 380/201 |

(Continued)

FOREIGN PATENT DOCUMENTS

WO    2005013272 A1    2/2005

OTHER PUBLICATIONS

Advanced Access Content System (AACS) Introduction and Common Cryptographic Elements. Feb. 17, 2006. p. 1-82.*

*Primary Examiner*—Christian LaForgia

(57) ABSTRACT

A record carrier, recording device, read-out device and method is provided which provides a flexible security level to protect user data during transmission over a communication bus, also when the data is recorded on a record carrier such as a recordable optical disc. In accordance with the method, management information comprising encryption indication information indicating that user data stored in an associated sector of a record carrier, such as a recordable optical disk, is to be encrypted by a read-out device before being transmitted over a communication bus.

13 Claims, 5 Drawing Sheets

U.S. PATENT DOCUMENTS

Figure 1:
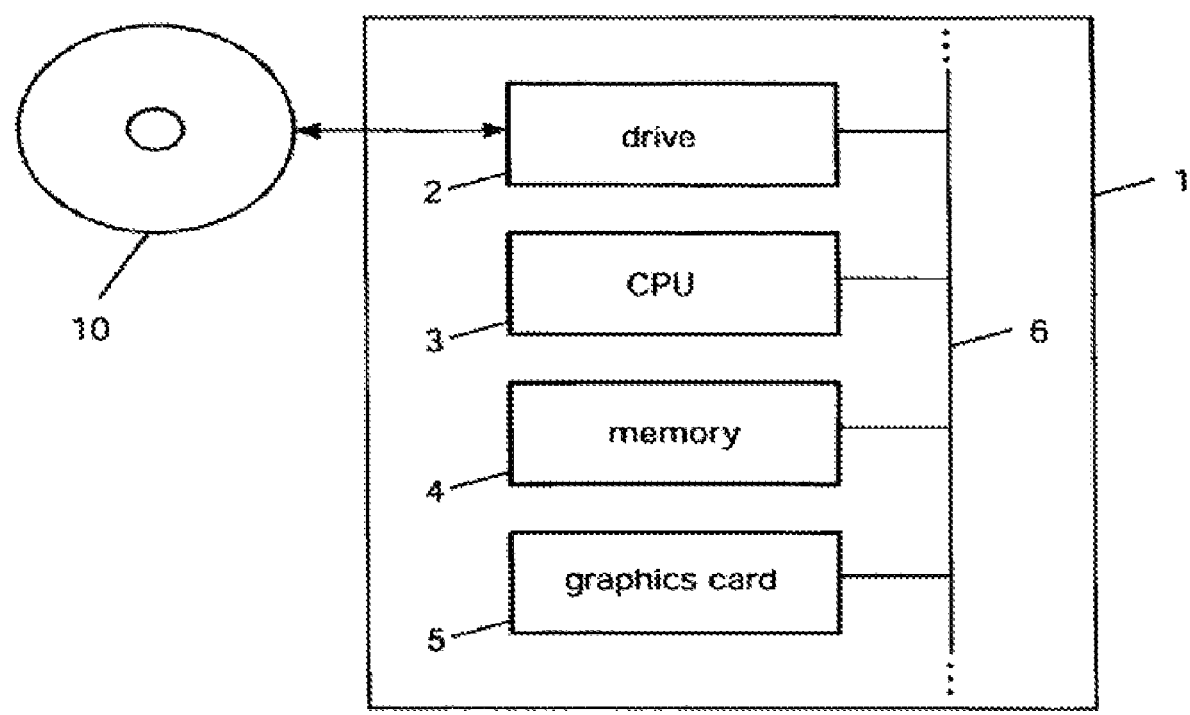

| | | | |
|---|---|---|---|
| 2002/0015494 A1* | 2/2002 | Nagai et al. | 380/201 |
| 2002/0141577 A1* | 10/2002 | Ripley et al. | 380/201 |
| 2002/0141578 A1* | 10/2002 | Ripley et al. | 380/201 |
| 2003/0091186 A1* | 5/2003 | Fontijn et al. | 380/201 |
| 2003/0091187 A1* | 5/2003 | Fontijn et al. | 380/201 |
| 2003/0159037 A1* | 8/2003 | Taki et al. | 713/168 |
| 2004/0190424 A1* | 9/2004 | Kawamae et al. | 369/94 |
| 2006/0239462 A1* | 10/2006 | Staring et al. | 380/277 |

* cited by examiner

RECORD CARRIER COMPRISING ENCRYPTION INDICATION INFORMATION

The present invention relates to a record carrier for storing user data in sectors and management information associated with said sectors. The present invention relates further to a read-out device for reading data from a record carrier and a corresponding read-out method. Still further, the present invention relates to a recording device and a corresponding recording method for recording data on a record carrier. Finally, the present invention relates to a computer program for implementing said methods.

Optical disc drives connect with other components in a personal computer (PC) via a communication bus, in particular a so-called PCI-bus. It is easy for hackers to listen to the communication over this bus and to get access to transmitted user data. A so-called bus encryption, according to which user data are encrypted before transmission over the communication bus and decrypted by the receiving component after transmission, is generally used to protect data transmission against eavesdropping. However, bus encryption requires significant computational effort which degrades the performance of application or increases the costs of such systems. The computational efforts could be reduced by not encrypting all user data in all sectors, but only encrypting a few sectors or part of the user data in a sector, or by choosing an encryption algorithm that requires less computational effort. Such measures would, however, weaken the protection.

Since different applications have different security requirements, and a single optical drive has to read and to protect data for many different applications, it is thus a problem to make an optical disc drive or, more generally, to provide a read-out device for reading data from a record carrier, that satisfies all needs with a single bus encryption method. In particular, this flexible security level shall be provided to protect user data during transmission over the communication bus when the user data is recorded on a record carrier, such as a recordable optical disc.

Many copy protection methods have been created to prevent copying of user data. One of these methods is based on so-called re-encryption according to which some sectors of the disc are encrypted and which will be decrypted by the drive before transmitting it via a secure communication channel to another component in a PC. The advantage of re-encryption is that the key used by the drive to decrypt the sector does not leave the drive and is therefore not easily discovered by hackers. However, the decryption of the encrypted sector requires significant computational effort which degrades the performance of the drive or increases the costs thereof. Although the computational effort can be reduced by the same measures as mentioned above, the strength of the protection will be weakened.

Since different applications have different security requirements it is therefore desired to provide a low-cost read-out device that is optimized for the security level of a single application and a general purpose read-out device that provides the right security level for all applications and can read record carriers for all applications. A method is therefore needed by which a general-purpose read-out device can determine if and, preferably, what type of encryption is to be used. Preferably, an additional information indicating if and which kind of decryption is required before encryption, should be provided.

It is thus an object of the present invention to provide a record carrier, a recording device and method as well as a read-out device and method which provide a flexible security level to protect user data during transmission over the communication bus, also when the data is recorded on a record carrier such as a recordable optical disc.

This object is achieved according to the present invention by a record carrier as claimed in claim 1 according to which the management information comprises an encryption indication information indicating that the user data stored in the associated sector are to be encrypted by a read-out device before being transmitted over a communication bus.

A read-out device for reading data from such a record data is defined in claim 7 and comprises a data interpreter for interpreting said management information, an encryption unit for encrypting user data of sectors for which the associated encryption indication information indicates that said user data are to be encrypted and an output unit for outputting said user data.

A recording device for recording data on such a record carrier is defined in claim 10 and comprises:

an input unit for receiving user data and a command to record said user data in sectors on a record carrier from a communication bus, a command interpreter for interpreting said command so as to identify a decryption indication information included therein indicating which parts of the received user data are encrypted and are to be decrypted before recording on said record carrier, a decryption unit for decrypting the parts of said user data for which the associated decryption indication information indicates that they are encrypted and are to be decrypted before recording on said record carrier, and a write unit for recording said user data in sectors on said record carrier and a management information associated with said sectors comprising an encryption indication information indicating that user data stored in sectors associated with said management information are to be encrypted by a read-out device before transmission over a communication bus.

Corresponding methods are defined in claims 9 and 11. A computer program for implementing said methods is defined in claim 13.

The present invention is based on the idea to signal to the read-out device that particular user data shall be encrypted by the read-out device before they can be transmitted over the communication bus, in particular a PCI-bus of PC. An encryption indication information is thus provided in the management information and associated with all sectors in which user data are stored which shall be encrypted before transmission over the communication bus. This encryption indication information will be read and evaluated by the read-out device which then encrypts the associated user data before they are outputted to the communication bus. The recording device according to the present invention is adapted such that during recording of user data such encryption indication information is assigned to the user data and also recorded on the record carrier for later read-out by the read-out device. Such encryption indication information is written based on a corresponding decryption indication information included in a command received by the recording device along with the instruction to record particular user data on a record carrier. The invention thus provides a simple, flexible and low-cost solution providing copy protection during transmission of user data over a communication bus which are read from a record carrier.

It should be noted that user data shall be understood as including any kind of data that are stored on a record carrier and can be transmitted over a communication bus, i.e. not only include data that are particularly meant for a user, such as audio, video or software data, but also include any other kind of data such as management data or control data.

Preferred embodiments of the invention are defined in the dependent claims. According to a simple embodiment the management information is stored in the sector header of each sector and the encryption indication information is a single bit which is used to trigger encryption of user data stored in the associated sector. However, the management information can be also stored in a separate (additional) sub-code channel besides the normal data channel.

According to further embodiments the management information comprises additional information indicating which part or parts of the user data are to be encrypted, which encryption algorithm is to be used for encryption, which key-hierarchy is to be used for determination of an encryption key to be used for encryption and/or indicating that the user data stored in the associated sectors are to be decrypted by the read-out device before being encrypted again for transmission. Again, these indicators could be single bits stored in the sector header. Preferably, the indication information that triggers bus-encryption is made independent from the indication information that triggers sector decryption because the security requirements for both methods may be different. If the triggers for bus encryption and sector decryption are independent, preferably the integrity of at least the bus encryption trigger is protected. This can be achieved by, e.g., making the sector decryption key dependent on at least the bus encryption trigger (for example XOR or hash the trigger into the key).

Figure 2:
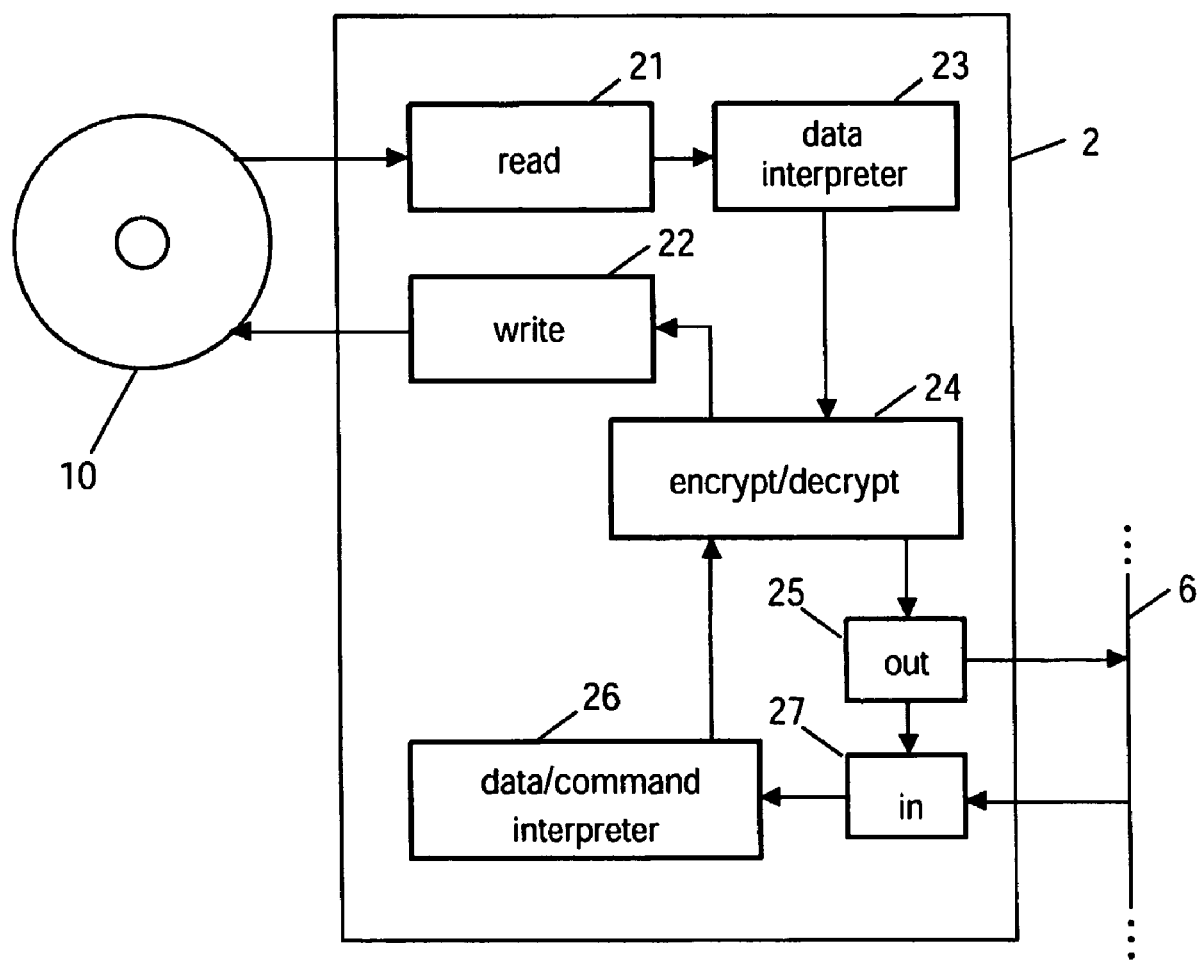
Figure 3:
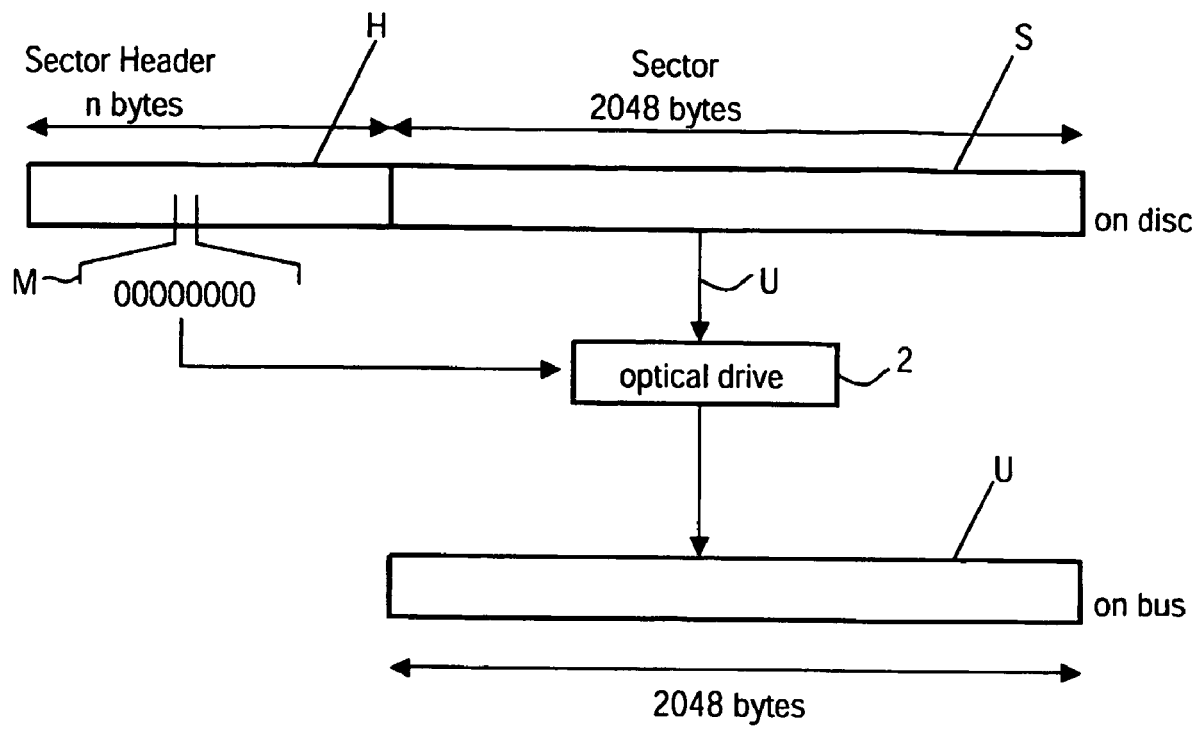
Figure 4:
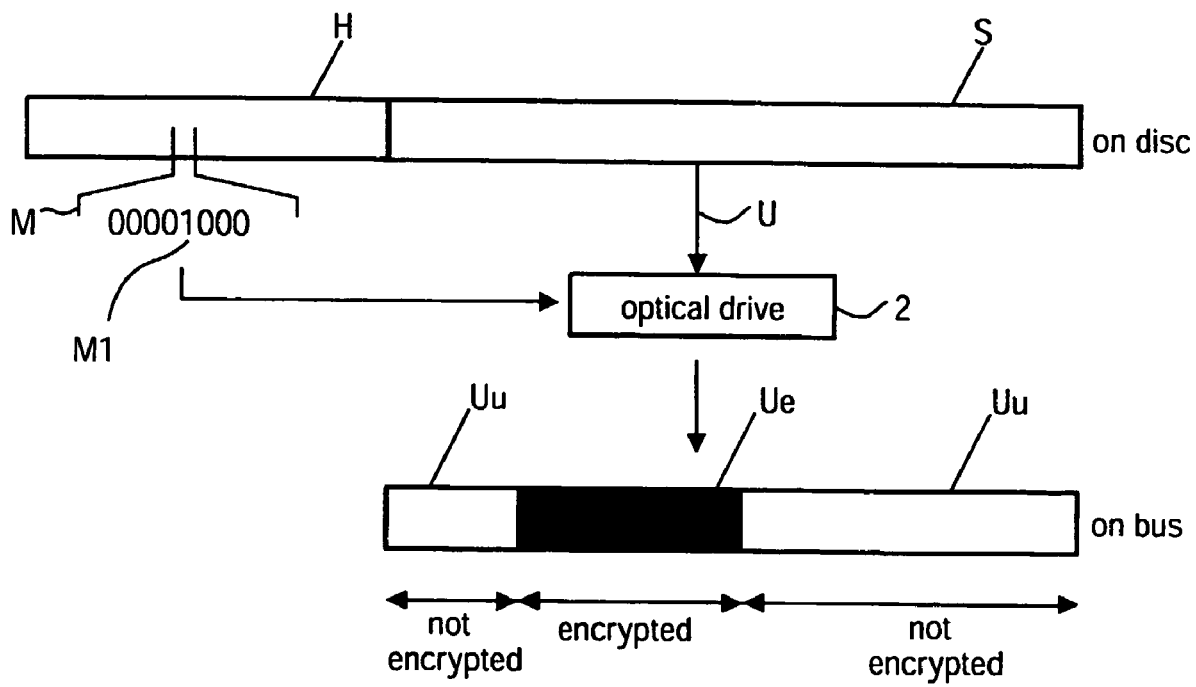
Figure 5:
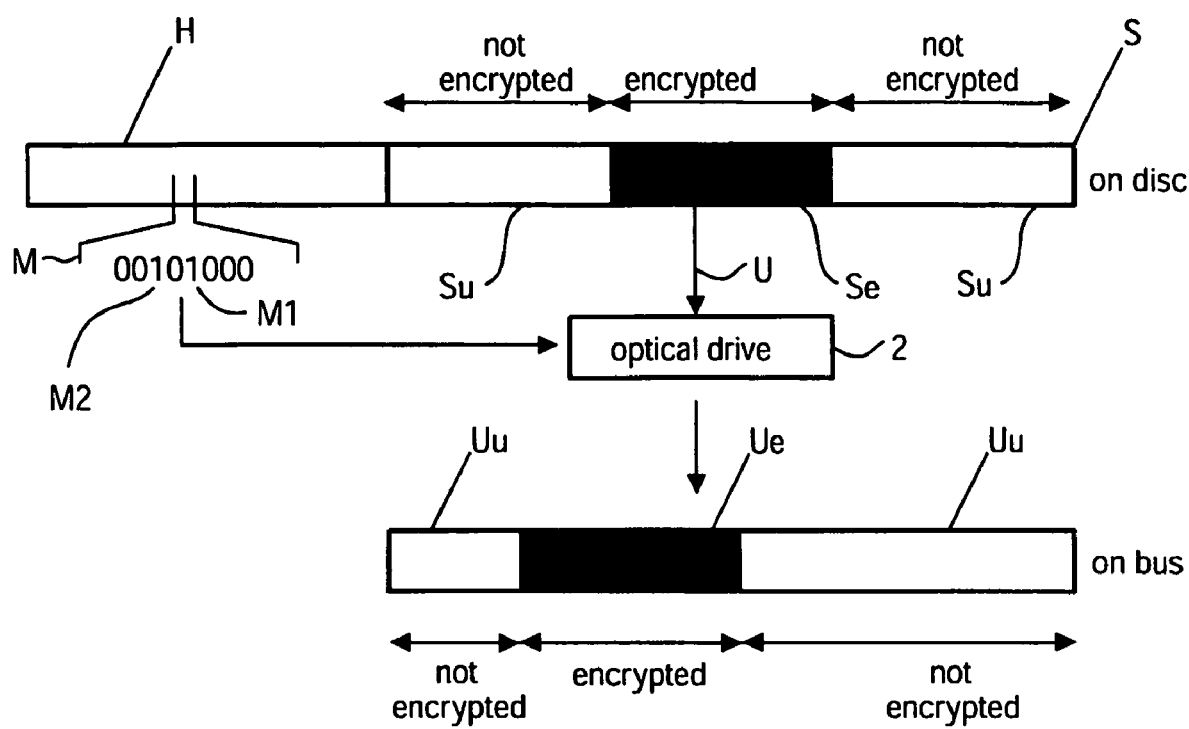
Figure 6:
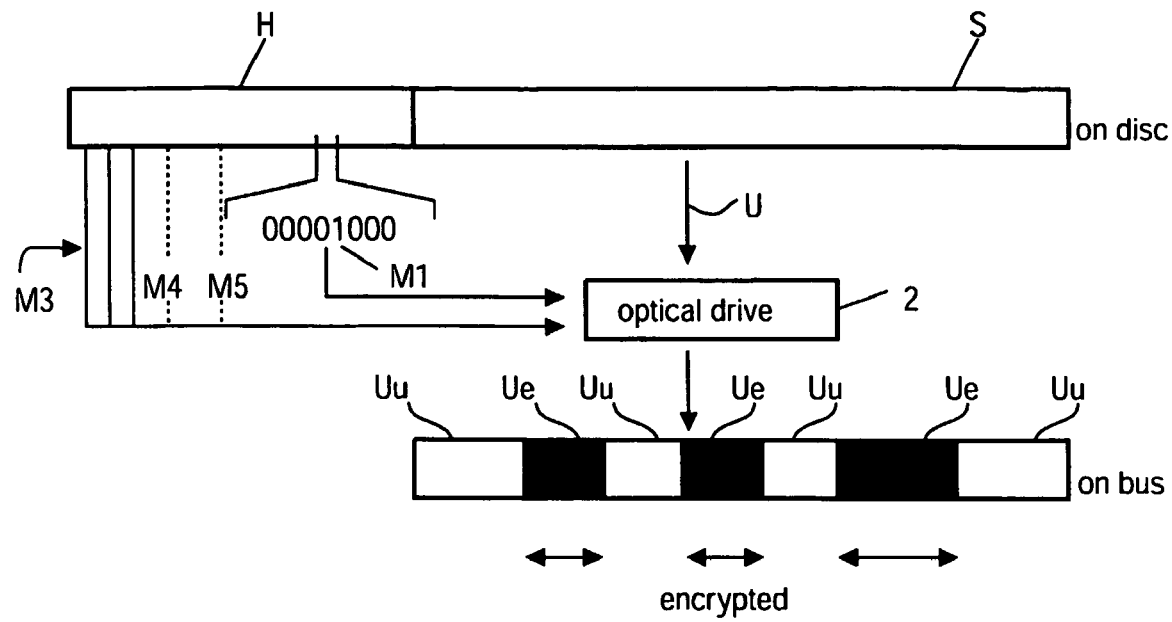
Figure 7:
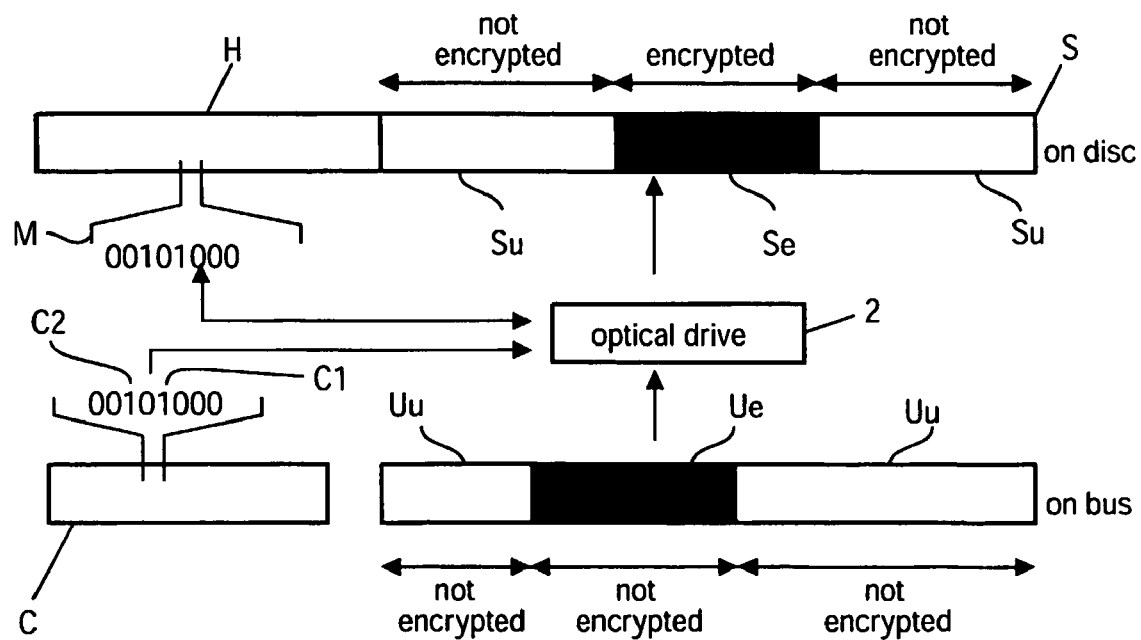

The invention will now be explained in more detail with reference to the drawings in which FIG. 1 shows a block diagram of a PC, FIG. 2 shows a block diagram of a read-out and recording device according to the invention, FIG. 3 illustrates a first embodiment of the invention, FIG. 4 illustrates the first embodiment of the invention with a different parameter setting, FIG. 5 illustrates a second embodiment of the invention, FIG. 6 illustrates a third embodiment of the invention and FIG. 7 illustrates a fourth embodiment of the invention.

FIG. 1 shows a block diagram of a PC 1 comprising a drive 2, for instance an optical disc drive, capable of reading data from a record carrier 10 and capable of writing data to said record carrier 10, a CPU (Central Processing Unit) 3, a memory 4 and a graphics card 5 all connected to a communication bus 6. For simplicity's sake no further details of the PC 1 are shown which may, of course, comprise further and other components as well.

FIG. 2 shows a block diagram of a drive 2 according to the present invention. For reading data from the record carrier 10 a reading unit 21 is provided; for writing data to said record carrier 10 a writing unit 22 is provided. When reading user data U from the record carrier 10 which are stored in sectors S, as shown in FIG. 3 by way of example of an optical disc having sectors of 2048 bytes length each, associated management information M stored in the sector header H associated to each sector S and, in this example, having n bytes, is read as well and forwarded to a data interpreter 23. Therein, the management information M, in the example shown in FIG. 3 being one byte comprising 8 bits, are evaluated in order to determine if the read user data stored in the associated sector S shall be encrypted by an encryption/decryption unit 24 before output by an output unit 25 and subsequent transmission over the communication bus 6.

In the embodiment shown in FIG. 3 the management information M only includes zero-bits meaning that no encryption of user data U is required before transmission over the communication bus. Thus, the user data will be directly outputted by the output unit 25 to the communication bus 6, i.e. the user data U will be communicated over the bus 6 in unencrypted form as shown in FIG. 3. In the embodiment shown in FIG. 4, the encryption indication information M1 included in the management information M indicates, by setting a one-bit, that the user data U stored in the sector S are to be encrypted before being outputted. Thus, the read user data U will be forwarded to the encryption/decryption unit 24 where they are encrypted, before being afterwards outputted to the communication bus. In this embodiment, only a fixed part Ue of the user data of the sector S is encrypted while other parts Uu are communicated in unencrypted form.

In the embodiment shown in FIG. 5 already part Se of the user data U stored on the record carrier in sector S is encrypted while other parts Su of the sector S are not encrypted. In the associated management information M, besides the encryption indication information M1, an additional decryption indication information M2 is included indicating that (part of) the user data U stored in the sector S need to be decrypted first before again encrypted (indicated by M1) and transmitted over the communication bus. Preferably, the decryption key of the encrypted part Se is dependent on the first indicator M1 (and optionally also on indicator M2). Thus, the encryption/decryption unit 24 first decrypts the encrypted portion Se of the sector S before part of the completely unencrypted user data U of the sector S are encrypted and transmitted over the bus. Preferably, different encryption/decryption keys and/or encryption/decryption algorithms are used for these two steps of decryption/encryption provided according to this embodiment.

The management information may further include additional information, such as an information indicating the amount of user data that needs to be decrypted before encryption, which algorithm to use for decryption and/or which key hierarchy to use for decryption.

According to still another embodiment as shown in FIG. 6 an additional encryption amount information M3 is provided as additional management information in the sector header A indicating which parts of the sector S must be encrypted by the drive 2. For instance, as shown in FIG. 6, three parts of the sector S which shall be encrypted (Ue) are indicated by the encryption amount information M3 while other parts of the sector remain unencrypted (Uu) before being transmitted over the bus.

Further information can be included in the management information, such as for instance an encryption algorithm information M4 indicating which encryption algorithm is to be used for encryption and/or a key hierarchy information M5 indicating which key-hierarchy is to be used for determination of an encryption key to be used for encryption.

The embodiment of the drive 2 shown in FIG. 2 further comprises a data/command interpreter 26 and an input unit 27 for reception of data from the communication bus 6. These units will be used for recording of data to the record carrier 10. In this case a command instructing the drive 2 to record particular user data is received along with that user data by the input unit 27 and is evaluated by the data/command interpreter 26. This embodiment is illustrated in FIG. 7 where the command C comprises a decryption indication information C2 (similar to M2 shown in FIG. 5) indicating that encrypted user data Ue received from the bus 6 need to be decrypted and an encryption indication information C1 indicating that (part of) the whole user data need to be encrypted before storage on the record carrier. In this case the integrity of at least the trigger for sector encryption (C1) must be protected. This can be achieved by, e.g., making the bus decryption key dependent on at least the sector encryption trigger (for example XOR or hash the trigger into the key).

These steps of encryption and decryption will be done by the encryption/decryption unit 24 before the partly encrypted user data are written to the record carrier 10 by the write unit 22. At the same time an appropriate management information M including indicators M1 and M2 is recorded in the sector header H. Of course, additional further information, similar to the additional further information illustrated above for the management information, can also be included in the command C.

According to the invention a simple, low-cost, flexible and secure solution for protection of user data stored on a record carrier before transmission over a communication bus of a PC is provided.

The invention claimed is:

1. Record carrier (10) for storing user data in sectors (S) and management information (M) associated with said sectors (S), wherein said management information (M) comprises an encryption indication information (M1) comprising a single bit associated with each of said sectors (S), each bit indicating to a read-out device whether the user data stored in the associated sector (S) are to be encrypted by the read-out device (2) before being transmitted over a communication bus (6).

2. Record carrier as claimed in claim 1, wherein said management information (M) is stored in a sector header (4) or in an additional sub-code channel.

3. Record carrier as claimed in claim 1, wherein said management information (M) further comprises an encryption amount information (M3) indicating which part or parts of the user data stored in the associated sector (S) are to be encrypted.

4. Record carrier as claimed in claim 1, wherein said management information (M) further comprises an encryption algorithm information (M4) indicating which encryption algorithm is to be used for encryption.

5. Record carrier as claimed in claim 1, wherein said management information (M) further comprises a key-hierarchy information (M5) indicating which key-hierarchy is to be used for determination of an encryption key to be used for encryption.

6. Record carrier as claimed in claim 1, wherein said management information (M) further comprises a decryption indication information (M2) indicating that the user data stored in the associated sector (S) are to be decrypted by the read-out device (2) before being encrypted again for transmission over said communication bus (6).

7. Record carrier as claimed in claim 6, wherein a decryption key for decryption of the user data is dependent on at least the encryption indication flag (M1).

8. Read-out device for reading data from a record carrier (10) storing user data in sectors (S) and management information (M) associated with said sectors (S), wherein said management information (M) comprises an encryption indication information (M1) comprising a single bit associated with each of said sectors (S), each bit (M1) indicating whether the user data stored in the associated sector (S) are to be encrypted by a read-out device (2) before being transmitted over a communication bus (6), comprising: a reading unit (21) for reading said user data and said management information (M) from said record carrier (10), a data interpreter (23) for interpreting said management information (M), an encryption unit (24) for encrypting user data of sectors (S) for which the associated encryption indication flag (M1) indicates that said user data are to be encrypted and an output unit (25) for outputting said user data.

9. Read-out method for reading data from a record carrier (10) storing user data in sectors (S) and management information (M) associated with said sectors (S), wherein said management information (M) comprises an encryption indication information (M1) comprising a single bit associated with each of said sectors (S), each bit (M1) indicating whether the user data stored in the associated sector are to be encrypted by a read-out (2) device before being transmitted over a communication bus (6), comprising the steps of: reading said user data and said management information (M) from said record carrier (10), interpreting said management information (M), encrypting user data of sectors (S) for which the associated encryption indication information (M1) indicates that said user data are to be encrypted and outputting said user data.

10. Recording device for recording data on a record carrier (10) comprising: an input unit (27) for receiving user data and a command (C) to record said user data in sectors (S) on a record carrier (10) from a communication bus (6), a command interpreter (26) for interpreting said command (C) so as to identify a decryption indication information (C2) included therein indicating which parts of the received user data are encrypted and are to be decrypted before recording on said record carrier (10), a decryption unit (24) for decrypting the parts of said user data for which the associated decryption indication information (M2) indicates that they are encrypted and are to be decrypted before recording on said record carrier (10), and a write unit (22) for recording said user data in sectors (S) on said record carrier (10) and a management information (M) associated with said sectors (S) comprising an encryption indication information (M1) comprising a single bit associated with each of said sectors (S), each bit (M1) indicating whether user data stored in sectors (S) associated with said management information (M) are to be encrypted by a read-out (2) device before transmission over a communication bus (6).

11. Recording method for recording data on a record carrier (10) comprising the steps of: receiving user data and a command (C) to record said user data in sectors (S) on a record carrier (10) from a communication bus (6), interpreting said command (C) so as to identify a decryption indication information (C2) included therein indicating which parts of the received user data are encrypted and are to be decrypted before recording on said record carrier (10), decrypting the parts of said user data for which the associated decryption indication information (C2) indicates that they are encrypted and are to be decrypted before recording on said record carrier (10), and recording said user data in sectors (S) on said record carrier (10) and a management information (M) associated with said sectors (S) comprising an encryption indication information (M1) comprising a single bit associated with each of said sectors (S), (M1) indicating that user data stored in sectors (S) associated with said management information (M) are to be encrypted by a read-out (2) device before transmission over a communication bus (6).

12. Recording method as claimed in claim 11, wherein said command (C) further comprises an encryption indication information (C1) and that a decryption key for decryption of the user data is dependent on said encryption indication information (C1).

13. A computer program embodied on a computer-readable medium for reading data from a record carrier (10) storing user data in sectors (S) and management information (M) associated with said sectors (S), wherein said management information (M) comprises an encryption indication information (M1) comprising a single bit associated with each of said sectors (S), each bit (M1) indicating that the user data stored in the associated sector are to be encrypted by a read-out (2) device before being transmitted over a communication bus (6), comprising:

a code segment for reading said user data and said management information (M) from said record carrier (10), and a code segment for interpreting said management information (M), encrypting user data of sectors (S) for which the associated encryption indication information (M1) indicates that said user data are to be encrypted and outputting said user data.

* * * * *